A. D. POWER.
BELT-FASTENING.
No. 175,299. Patented March 28, 1876.
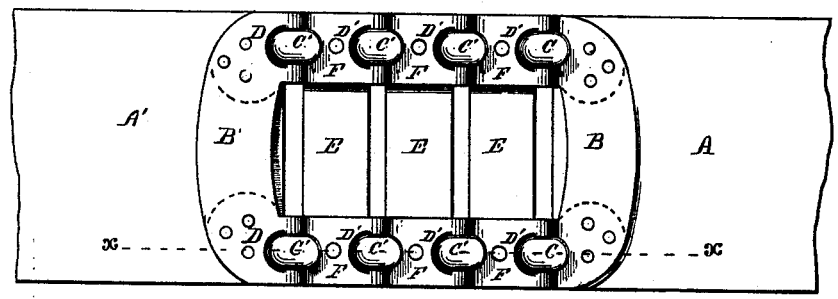
Fig. 1.
Fig. 2.
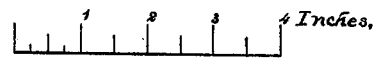
Scale.
Witnesses:
John H. Campbell
H. C. Lockwood
Inventor:
Augustus D. Power,
by Humphrey & Stuart
his Attys.

UNITED STATES PATENT OFFICE.

AUGUSTUS D. POWER, OF AKRON, OHIO.

IMPROVEMENT IN BELT-FASTENINGS.

Specification forming part of Letters Patent No. 175,299, dated March 28, 1876; application filed February 1, 1876.

*To all whom it may concern:*

Be it known that I, AUGUSTUS D. POWER, of the city of Akron, in the county of Summit and State of Ohio, have invented an Improvement in Adjustable Belt-Fastenings, of which the following is a specification:

This invention has for its object to furnish a belt-fastening by which a belt can be lengthened or shortened with facility, as occasion requires; and it consists in the combination with the belt of a hook-plate at one end and an eye-plate at the other, with a series of removable intermediate sections having hooks at one end and eyes at the other, whereby the belt is adapted to be shortened or lengthened by removing or adding such sections, as required.

In the accompanying drawings, Figure 1 is a plan of the two ends of a four-inch belt, and short sections of belt provided with my improved fastenings; and Fig. 2 a section of the same at the line $x\ x$.

Upon the end A is riveted the plate B, from which project the hooks C C, of the shape shown. A similar plate, B', is riveted to the end A' and provided with eyes D D, and the two are so arranged as to hook together and form a flexible fastening.

E E are short sections of similar belt, to each end of which are riveted plates F F, having at one end hooks C' C', and upon the other eyes D' D', and these hooks and eyes correspond in position with and are similar to the hooks C C and eyes D D.

When a new belt is put in use, a number of these short sections are interposed between the ends of the belts, and removed as the belt grows slack by stretching, or others can be added if the belt shrinks.

The plates, hooks, and eyes may be of brass, malleable iron, or other suitable metal, and the number of rows of hooks and eyes will depend upon the width and strain of the belt.

Instead of single plates B B', a number of smaller plates may be used, as indicated by dotted lines in Fig. 1.

The advantages I claim for this fastening are: Durability, as one set of fastenings will outlast several belts; strength and flexibility, as the rivet-heads on one side of the belt and the plate on the other form a secure clamp upon the belt, while the shape of the hook and eye permit the belt to adapt itself to the smallest pulley without strain on the fastening; and facility of adjustment, as but a moment is required to detach and remove or add section.

The plates, when attached, present a straight edge to the belt, so that a shifter or guide may be used without difficulty.

I claim as my invention—

In combination with the ends of a belt, the hook-plate B and eye-plate B' and a series of removable sections, E, having hooks at one end and eyes at the other, whereby the belt is adapted to be shortened or lengthened by removing or adding said sections, as set forth.

AUGUSTUS D. POWER.

Witnesses:
C. P. HUMPHREY,
E. N. STUART.